Nov. 25, 1969
G. H. HENDRICKSON
3,479,715
APPARATUS FOR REPLACING ROTATABLE MEMBERS
Filed Oct. 26, 1967
4 Sheets-Sheet 1
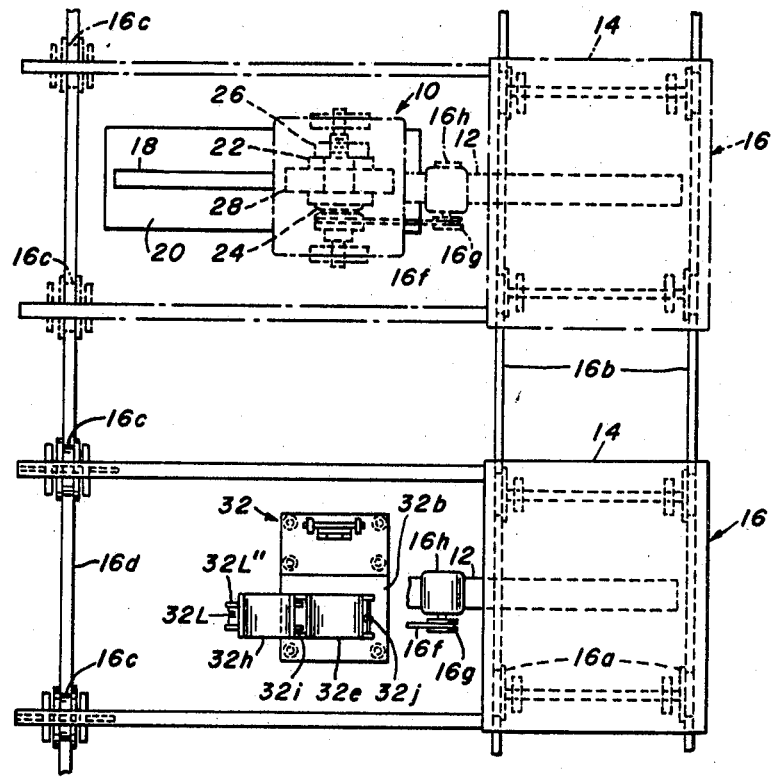
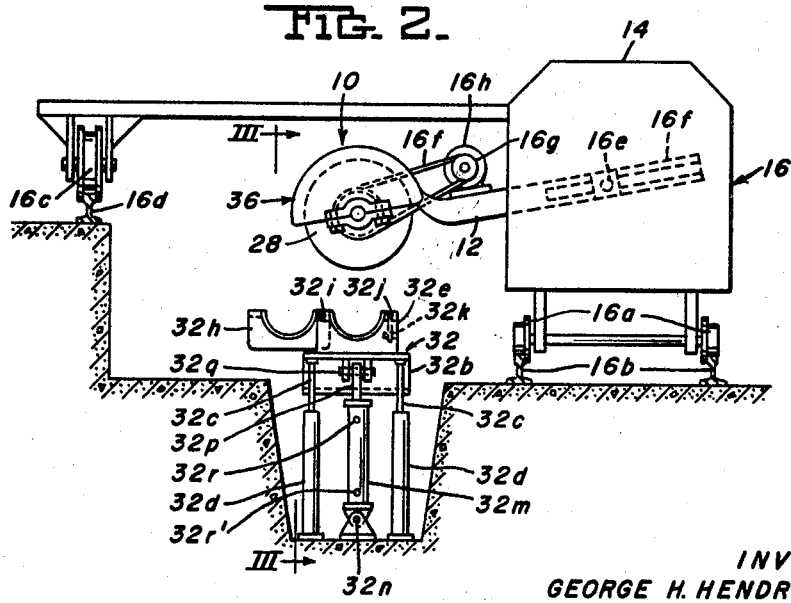
INVENTOR.
GEORGE H. HENDRICKSON
By Donald G. Dalton
Attorney

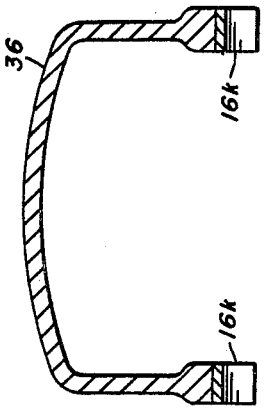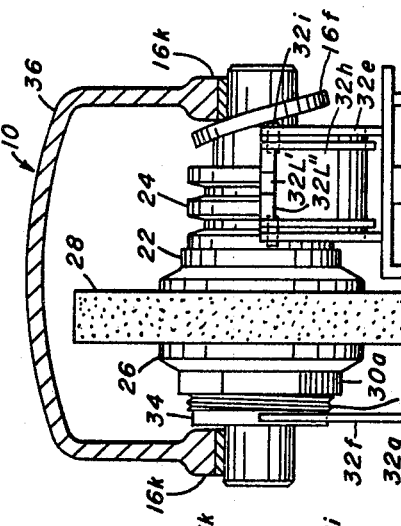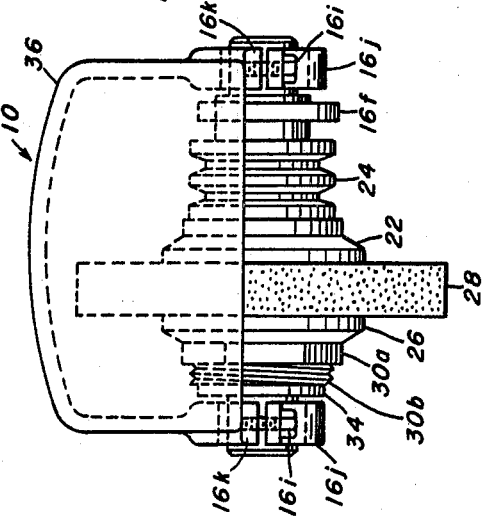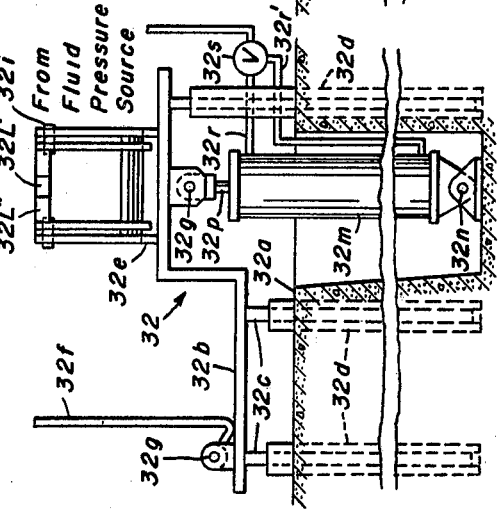

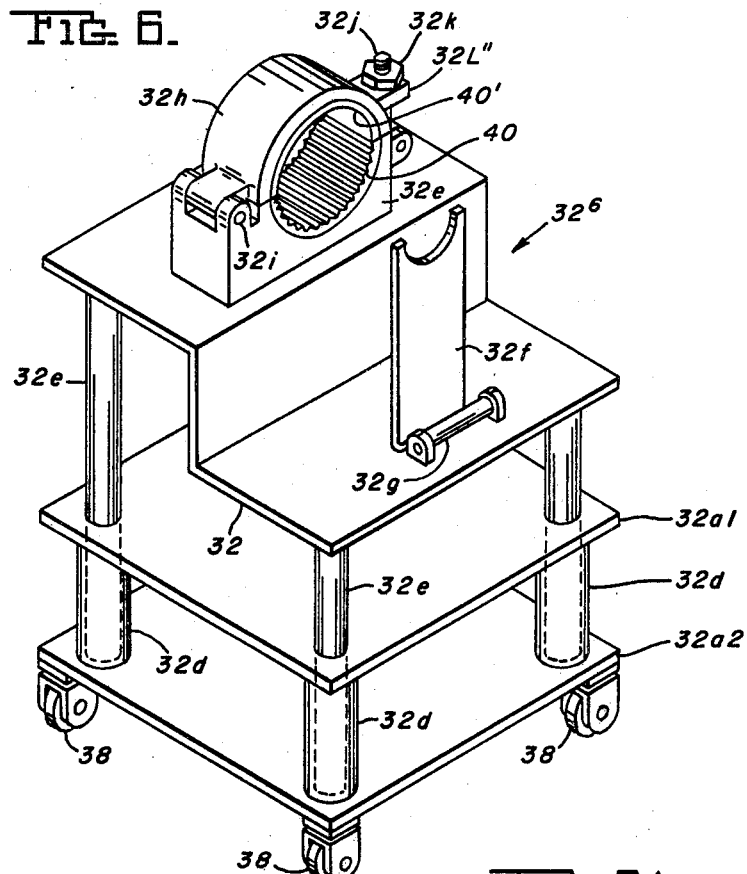
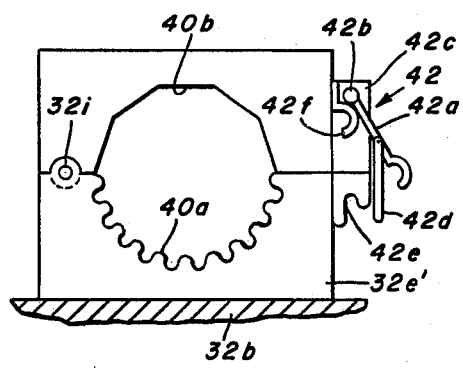
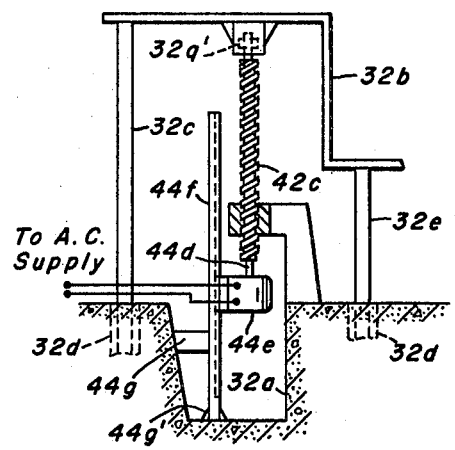

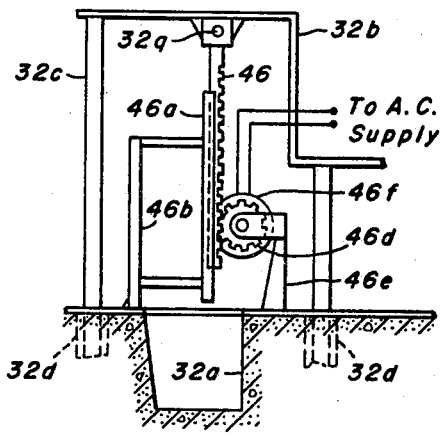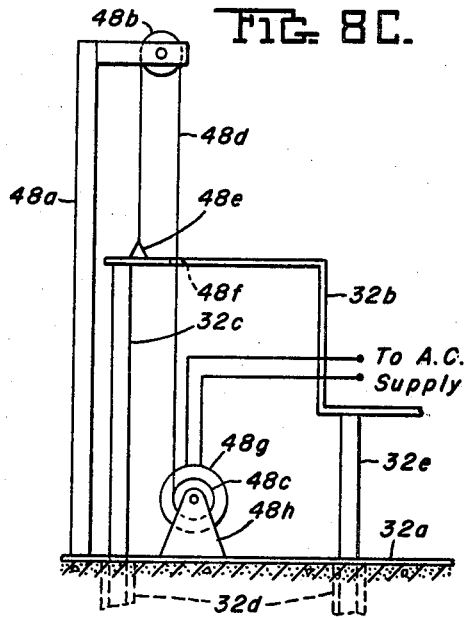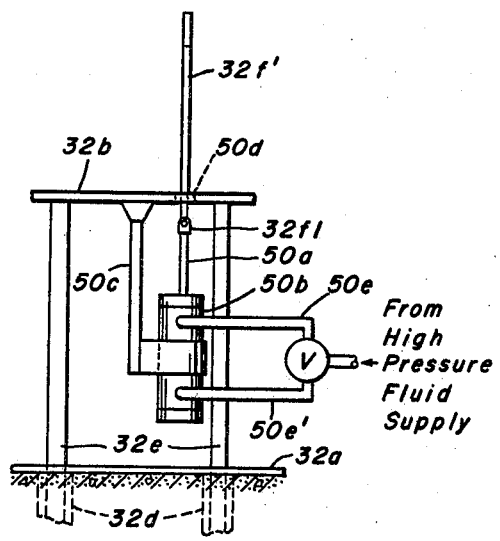

United States Patent Office 3,479,715
Patented Nov. 25, 1969

3,479,715
APPARATUS FOR REPLACING ROTATABLE MEMBERS
George H. Hendrickson, Oaklawn, Ill., assignor to United States Steel Corporation, a corporation of Delaware
Filed Oct. 26, 1967, Ser. No. 678,233
Int. Cl. B23p 19/02
U.S. Cl. 29—200                                     20 Claims

ABSTRACT OF THE DISCLOSURE

This disclosure relates to an improved apparatus for replacing rotatable members and, more particularly, to a method of and an apparatus for supporting a shaft member to permit its disengagement from a supporting member, for moving the shaft member away from the supporting member, for clamping the shaft member to permit removal of the securing means for retaining the rotatable member on the shaft member, replacement of the rotatable member and the reassembly of the securing means on the shaft member, for supporting and unclamping the shaft member and for moving the shaft member into engagement with the supporting member to permit its attachment to the supporting member.

Background of the invention

Heretofore, a rotatable member, such as a heavy oscillatable reciprocable grinding wheel (mounted on a mandrel carried by an oscillatable and reciprocable ram projecting from the grinding apparatus) was replaced with considerable down time and at great expense. In order to accomplish the replacement of the grinding wheel, the wheel and mandrel assembly was removed from and replaced on the ram by crane, hoist or the like and appreciable manual labor.

Objects of the invention

It is the general object of the present invention to avoid and overcome the foregoing and other difficulties of and objections to prior art practices by the provision of an improved and apparatus for facilitating the changing of a rotatable member, which apparatus:

(a) is simple and efficient;
(b) substantially reduces the down time of the associated apparatus during replacement; and
(c) materially reduces the manual labor costs involved in the replacement.

Brief summary of the invention

The aforesaid objects of this invention, and other objects which will become apparent as the description proceeds, are achieved by providing an improved replacement apparatus for a mounting assembly. This mounting assembly has a supporting member, a shaft member rotatable on the supporting member and has a first end portion and a second end portion, a rotatable member on the shaft member and securing means on one of the first end portion and the second end portion for retaining the rotatable member on the shaft member. The improved apparatus supports the shaft member to permit its disengagement from the supporting member, moves the shaft member away from the supporting member, clamps the shaft member to permit removal of the securing means, permits the replacement of the rotatable member and the reassembly of the securing means on the shaft member, supports and unclamps the shaft member and moves the shaft member into engagement with the supporting member to permit its attachment to the supporting member.

This apparatus has a frame, a table reciprocable on the frame, a first supporting means on the table for supporting the other of the first end portion and the second end portion, a second supporting means on the table for supporting the one of the first end portion and the second end portion, clamping means on the first supporting means, and drive means connected to the table for reciprocating the table between a first position and a second position. This first supporting means is operable while in the first position to support the other. The second supporting means is operable while in the first position to support the one to permit the disengagement of the shaft member from the supporting member. The drive means is also operable to move the first supporting means, the second supporting means and the shaft member supported thereby away from the supporting member to the second position. The clamping means is operable to secure the other between the first supporting means and the clamping means. The second supporting means is operable to release the one to permit the removal of the securing means from the shaft member, the replacement of the rotatable member on the shaft member and the reassembly of the securing means on the shaft member. The second supporting means is then operable to support the one to permit the clamping means to release the other. The drive means is then operable to move the shaft member to the first position into engagement with the supporting member to permit the securement of the shaft member to the supporting member.

The invention further contemplates the combination of the mounting apparatus and the apparatus for facilitating the replacement of the rotatable member.

Brief description of the several views of the drawings

For a better understanding of this invention reference should be had to the accompanying drawings, wherein like numerals of reference indicate similar parts throughout the several views and wherein:

FIGURE 1 is a plan view of a grinding apparatus for reconditioning metallic bars, billets and the like showing the grinding apparatus in a dotted line work position above a bar workpiece on a work table and in a solid line replacement position above the apparatus of this invention with the ram and wheel assembly broken away for clarity to show the replacement apparatus therebeneath;

FIGURE 2 is a side elevational view of the grinding apparatus and the apparatus of this invention showing the replacement apparatus in a second or down position;

FIGURE 3 is an enlarged view taken along the line III—III of FIGURE 2 in the direction of the arrows;

FIGURE 4 is a view similar to FIGURE 3 showing the replacement apparatus in a first or supporting position in engagement with the shaft member and with the clamping means in the unclamped position;

FIGURE 5 is a view similar to FIGURES 3, 4 showing the replacement apparatus and the shaft member and rotatable member in the second or down position with the clamping means clamped about the shaft member;

FIGURE 6 is a perspective view of an alternative or portable embodiment of the replacement apparatus;

FIGURE 7 is a fragmentary view of an alternative embodiment of the upper and lower clamps;

FIGURES 8A–8C are fragmentary views of alternative embodiments of the drive means; and FIGURE 9 is a fragmentary view of an alternative embodiment of the steady rest.

Although the principles of this invention are broadly applicable to the replacement of a rotatable member of a mounting assembly, this invention is particularly adapted for use in conjunction with the replacement of a grinding wheel of grinding apparatus for reconditioning bars, billets and the like, and hence it has been so illustrated and will be so described.

3

Detailed description

With specific reference to the form of this invention illustrated in the drawings, and referring particularly to FIGURES 1–5, a mounting assembly is indicated generally by the reference numeral 10.

This mounting assembly 10 has a supporting member, such as a ram 12 (FIGURES 1, 2), which ram 12 is oscillatable and reciprocable with respect to a housing 14 (FIGURES 1, 2) of a grinding apparatus 16 (FIGURES 1, 2) utilized for reconditioning workpieces, such as a bar 18 or the like. The bar 18 is disposed on a work table 20 (FIGURE 1).

Referring to FIGURES 1 and 2, the grinding apparatus 16 is provided with wheels 16a riding on tracks 16b and outrigger-type wheels 16c engaging a track 16d. The ram 12 is oscillatable in the housing 14 at 16e (FIGURE 2) and is reciprocable on bar 16f by conventional means (not shown).

A shaft member, such as a mandrel 22 (FIGURES 1, 3–5), is rotatable in a housing 36 (FIGURES 1–5) on the ram 12 and has a first end portion, suitably a belt drive portion 24 (FIGURES 1, 3, 4), and a second end portion, suitably a securing portion 26 (FIGURES 1, 3–5) for securing a grinding wheel 28 (FIGURES 1–5) on the mandrel 22 by means of securing means, such as a lock washer 30a and a nut 30b on the threaded securing end portion 26. The securing means may be disposed on one of the two end portions 24, 26, in this case the end portion 26 for securing the grinding wheel 28 on the mandrel 22.

An improved wheel replacement apparatus 32 (FIGURES 1–5) is provided according to this invention, which apparatus 32 supports the grinding wheel 28 (FIGURE 4) to permit its disengagement from the ram 12, moves the mandrel 22, etc., away from the ram 12 to the position shown in FIGURE 5, clamps the mandrel 22 (FIGURE 5) to permit the removal of the washer 30a and nut 30b, the replacement of the grinding wheel 28 and the reassembly of washer 30a and nut 30b on the securing end portion 26, supports and unclamps the mandrel 22, and moves the mandrel 22 into engagement with the housing 36 of the ram 12 to permit attachment of the mandrel 22 to the housing 36.

The replacement apparatus 32 has a frame, suitably the floor 32a (FIGURES 3–5) or a plate (not shown in FIGURES 3–5), a table 32b (FIGURES 1–5) reciprocable with respect to the floor 32a on a plurality of rods 32c (FIGURES 2–5) projecting downwardly from the table 32b into registering guides 32d in the floor 32a. For the purpose of supporting the other of the first end portion 24 and the second end portion 26, in this case the belt drive portion 24, a first supporting means, such as a bottom half clamp 32e (FIGURES 1–5) is mounted on the table 32b. In order to support the securing portion 26 and in particular a notch 34 (FIGURES 3–5) therein, a second supporting means, suitably a steady rest 32f (FIGURES 3–5), is pivotable at 32g on the table 32b.

Clamping means, such as a top half clamp 32h (FIGURES 1–5), is pivotable at 32i (FIGURES 1, 2) on the bottom half clamp 32e. A threaded bolt 32j (FIGURES 2, 5) is pivotable at 32j' (FIGURES 2, 3) on the bottom half clamp 32e and carries a nut 32k thereon, which nut 32k secures the top half clamp 32h to the bottom half clamp 32e (FIGURE 5) after insertion of the bolt 32j in a keeper slot 32L' (FIGURES 1, 3, 4) in a lug 32L" on the top half clamp 32h and tightening of the nut 32k against the sides of the keeper slot 32L'. Alternatively the bolt 32j may be carried by the top half clamp 32h and the keeper slot 32L' provided in the bottom half clamp 32e.

Drive means, such as a fluid cylinder 32m (FIGURES 2–5, containing air, oil or the like) is secured to the floor 32a at 32n and has its piston 32p (FIGURES 3–5) connected at 32q to the table 32b. Flexible lines 32r, 32r' (FIGURES 3–5) connect the cylinder 32m through a two-way valve 32s (FIGURE 3) to a suitable high-pressure supply indicated by the legend "from high-pressure fluid supply." The drive means reciprocates the table 32b between a first or up position (FIGURE 4) and a second or down position (FIGURES 2, 3, 5).

Operation

Preparatory for the replacement of the grinding wheel 28 the grinding apparatus 16 is moved from the dotted line work position of FIGURE 1 to the wheel replacement or solid line position of FIGURE 1 with the end portions 22, 24 of the mandrel 22 in registering alignment with the lower clamp 32e and upright steady rest 32f respectively. The belt 16f (FIGURE 3) is moved off the belt drive end portion 24 to the left against the housing 36. As shown in FIGURES 1, 2, the belt 16f extends from the belt drive end portion 24 to a pulley 16g on a motor 16h.

The drive means first moves the table 32b and the clamps 32e, 32h and the steady rest 32f carried thereby from the down position (FIGURES 2, 3, 5) into the up or supporting position (FIGURE 4) so that the lower clamp 32e and steady rest 32f support respectively, the belt drive portion 24 and the notch 34 on the securing end portion 26, thereby permitting the disengagement of the mandrel 22 from the housing 36 on the ram 12 by the removal of screws 16i (FIGURE 3) which secure bottom bearings 16j (FIGURE 3) to top bearings 16k (FIGURES 3, 4).

The drive means then moves the lower clamp 32e and the steady rest 32f and the mandrel 22 supported thereby away from the housing 36 on the ram 12 (FIGURE 4) to the down or clamping position (FIGURE 5). The upper clamp 32h is then clamped about the belt drive portion 24 to secure the belt drive portion 24 between itself and lower clamp 32e. The steady rest 32f is tapped by a hammer (not shown) or the like from the position shown in FIGURE 4 to the position shown in FIGURE 5, thereby releasing the securing end portion 26 to permit the removal of the washer 30a and nut 30b from the securing end portion 26, the replacement of the grinding wheel 28 and the reassembly of the washer 30a and nut 30b on he securing end portion 26 of the mandrel 22.

The steady rest 32f is then moved from the reclining position shown in FIGURE 5 to the upright supporting position (FIGURE 4) to permit the release of the upper clamp 32h. The drive means then moves the mandrel 22 into registering engagement (FIGURE 4) with the top bearings 16k on the housing 14 to permit the positioning of the bottom bearings 16j about the end portions 24, 26 and reattachment of such bottom bearings 16j to the top bearings 16k by the screws 16i. The belt 16f is then repositioned on the belt drive portion 24 as shown in FIGURES 1, 2. Thereafter the drive means lowers the wheel replacement apparatus 32 from the position of FIGURE 4 to the down position (FIGURE 5).

Alternative embodiments

It will be understood by those skilled in the art that alternatively as shown in the portable replacement apparatus 32⁶ of FIGURE 6, the frame comprises the plates 32a1 and 32a2 with the guides 32d disposed therebetween, caster-type wheels 38 are mounted on the bottom plate 32a2. The bottom clamp 32e is provided with a separated gripping surface 40 and the top clamp 32h is provided with a belt lining-type gripping surface 40'.

Referring to FIGURE 7 and for purposes of compact illustration, the lower clamp 32e' is provided with a corrugated gripping surface 40a and the upper clamp 32h' is provided with a polygonal cross section gripping surface 40b. It will be understood that both the lower clamp 32e' and the upper clamp 32h' will be provided in actual practice with the same type gripping surface, either the corrugated gripping surface 40a or the polygonal type gripping surface 40b. In addition the locking or clamping device 42 has an arm 42a pivotable at 42b on a lug 42c on one of the upper clamp 32h' and the lower clamp 32e' (in this case on the upper clamp 32h'). A latch 42d engages and locks against another lug 42e on the lower clamp 32e'. A leaf spring 42f biases the arm 42a and a handle 42g is provided on the arm 42a.

As shown in FIGURE 8A the drive means has a screw collar 44a mounted on a bracket 44b upstanding from the frame 32a. A screw member 42c is movable or rotatable in the screw collar 44a by means of a shaft 44d connected to a motor 44e and is rotatably connected to the table 32b at 32q'. The motor 44e is connected by suitable lines to a voltage supply indicated by the legend "AC SUPPLY," and is reciprocable in an upright slide 44f secured to the floor 32a at 44g and 44g'.

In FIGURE 8B the drive means has a guide 46a mounted by means of a bracket 46b on the frame 32a, a rack member 46c connected at 32q to the table 32b and reciprocable in the guide 46a, a gear 46d mounted on a bracket 46e engageable with the rack member 46c to cause reciprocable movement of the rack member 46c and the table 32b. A motor 46f drives the gear 46d.

The drive means shown in FIGURE 8C has a post 48a upstanding from the frame 32a for supporting a guide means, such as a roller, sprocket 48b or the like, a rotatable take-up means, such as a roller or sprocket 48c and a flexible member 48d such as a rope, cable, chain or the like, connected at 48e to the table 32b and extending around the roller 48b through an aperture 48f in the table 32b and around the take-up roller 48c. A reversible motor 48g is mounted on a bracket 48h upstanding from the frame 32a.

Referring now to the steady rest 32f shown in FIGURE 4, it will be understood that the steady rest 32f may also support the securing end 26 by engaging the nut 30b or the washer 30a.

As shown in FIGURE 9 the steady rest 32f' is mounted at 32f1 on a piston 50a of a fluid cylinder 50b, which cylinder 50b is mounted by means of a support 50c depending from the table 32b. Alternatively the fluid cylinder 50b can be mounted (not shown) on the frame 32a. In this case the steady rest 32f is reciprocable by the fluid cylinder 50b in an aperture 50d in the table 32b between the supporting position (FIGURE 9) and a rest or lowered position (not shown in FIGURE 9). Lines 50e, 50e' connect the fluid cylinder 50b through a valve 50f to a high-pressure fluid supply. Alternatively the drive means shown in FIGURES 8A–8C may be substituted for the fluid cylinder 50b.

Summary of the achievement of the objects of the invention

It will be recognized by those skilled in the art that the objects of this invention have been achieved by providing an improved apparatus for facilitating the changing of a rotatable member which method and apparatus are simple and efficient, substantially reduce the down time of the associated apparatus during replacement, and materially reduce the mandrel labor costs involved in the replacement.

While in accordance with the patent statutes preferred and alternative embodiments of this invention have been illustrated and described in detail, it is to be particularly understood that the invention is not limited thereto or thereby.

I claim:

1. For a mounting assembly having a supporting member, a shaft member rotatable on said supporting member and having a first end portion and a second end portion, a rotatable member on said shaft member and securing means on one of said first end portion and said second end portion for retaining said rotatable member on said shaft member, apparatus for supporting said shaft member to permit its disengagement from said supporting member, for moving said shaft member away from said supporting member, for clamping said shaft member to permit removal of said securing means, replacement of said rotatable member and the reassembly of said securing means on said shaft member, for supporting and unclamping said shaft member and for moving said shaft member into engagement with said supporting member to permit its attachment to said supporting member, said apparatus having:

(a) a frame;
(b) a table reciprocable on said frame;
(c) a first supporting means on said table for supporting the other of said first end portion and said second end portion;
(d) a second supporting means on said table for supporting said one of said first end portion and said second end portion;
(e) clamping means on said first supporting means; and
(f) drive means connected to said table for reciprocating said table between a first position and a second position,
  (1) said first supporting means being operable while in said first position to support said other and said second supporting means being operable while in said first position to support said one to permit the disengagement of said shaft member from said supporting member,
  (2) said drive means being then operable to move said first supporting means, said second supporting means and said shaft member supported thereby away from said supporting member to said second position,
  (3) said clamping means being then operable to secure said other between said first supporting means and said clamping means,
  (4) said second supporting means being then operable to release said one to permit the removal of said securing means from said shaft member, the replacement of said rotatable member on said shaft member and the reassembly of said securing means on said shaft member,
  (5) said second supporting means being then operable to support said one to permit said clamping means to release said other,
  (6) said drive means being operable to move said shaft member to said first position into engagement with said supporting member to permit the securement of said shaft member to said supporting member.

2. The apparatus recited in claim 1 wherein said drive means is first operable to move said first supporting means and said second supporting means from said second position to said first position.

3. The apparatus recited in claim 1 wherein said drive means is thereafter operable to move said first supporting means and said second supporting means from said first position to said second position.

4. In combination:

(a) a mounting assembly having:
  (1) a supporting member,
  (2) a shaft member rotatable on said supporting member and having a first end portion and a second end portion,
  (3) a rotatable member on said shaft member, and
  (4) securing means on one of said first end portion and said second end portion for retaining said rotatable member on said shaft member; and (b) apparatus for supporting said shaft member to permit its disengagement from said supporting member, for moving said shaft member away from said supporting member, for clamping said shaft member to permit removal of said securing means, replacement of said rotatable member and the reassembly of said securing means on said shaft member, for supporting and unclamping said shaft member and for moving said shaft member into engagement with said supporting member to permit its attachment to said supporting member, said apparatus having:
  (1) a frame,
  (2) a table reciprocable on said frame,
  (3) a first supporting means on said table for supporting the other of said first end portion and said second end portion,
  (4) a second supporting means on said table for supporting said one of said first end portion and said second end portion,
  (5) clamping means on said first supporting means, and
  (6) drive means connected to said table for reciprocating said table between a first position and a second position,
    (a) said first supporting means being operable while in said first position to support said other and said second supporting means being operable while in said first position to support said one to permit the disengagement of said shaft member from said supporting member,
    (b) said drive means being then operable to move said first supporting means, said second supporting means and said shaft member supported thereby away from said porting member to said second position,
    (c) said clamping means being then operable to secure said other between said first supporting means and said clamping means,
    (d) said second supporting means being then operable to release said one to permit the removal of said securing means from said shaft member, the replacement of said rotatable member on said shaft member and the reassembly of said securing means on said shaft member,
    (e) said second supporting means being then operable to support said one to permit said clamping means to release said other,
    (f) said drive means being operable to move said shaft member to said first position into engagement with said supporting member to permit the securement of said shaft member to said supporting member.

5. The apparatus recited in claim 4 wherein said drive means is first operable to move said first supporting means and said second supporting means from said second position to said first position.

6. The apparatus recited in claim 4 wherein said drive means is thereafter operable to move said first supporting means and said second supporting means from said first position to said second position.

7. The apparatus recited in claim 1 wherein said frame has a plurality of wheels mounted thereon.

8. The apparatus recited in claim 1 wherein said first supporting means has a serrated gripping surface.

9. The apparatus recited in claim 1 wherein said first supporting means has a corrugated gripping surface.

10. The apparatus recited in claim 1 wherein said first supporting means has a polygonal gripping surface.

11. The apparatus recited in claim 1 wherein said first supporting means has a brake lining type gripping surface.

12. The apparatus recited in claim 1 wherein said clamping means has an upper clamp, a threaded member pivotable on one of the upper clamp and said first supporting means, a keeper on the other of said upper clamp and said first supporting means, and securing means on said threaded member engageable with said keeper to clamp said upper clamp to said first supporting means.

13. The apparatus recited in claim 1 wherein said clamping means has an upper clamp, an arm member pivotable on one of said upper clamp and said first supporting means, a latch pivotable on said arm member and engageable with the other of said upper clamp and said first supporting means to clamp said upper clamp to said first supporting means.

14. The apparatus recited in claim 1 wherein said drive means is a hydraulic cylinder connected to said table.

15. The apparatus recited in claim 1 wherein said drive means has a screw collar on said frame and a screw member movable in said screw collar and connected to said table.

16. The apparatus recited in claim 1 wherein said drive means has a guide means on said frame, a rack member connected to said table and reciprocable in said guide means and a gear means engageable with said rack member to cause reciprocable movement of said rack member in said guide means.

17. The apparatus recited in claim 1 wherein said drive means has a post member on said frame, guide means on said post member, rotatable take-up means on said frame and a flexible member connected to said table, and extending around said guide means and said take-up means.

18. The apparatus recited in claim 1 wherein said second supporting means has a steady rest movable from a rest position to a supporting position.

19. The apparatus recited in claim 17 wherein said steady rest is oscillatable between said rest position and said supporting position.

20. The apparatus recited in claim 17 wherein said steady rest is reciprocable between said rest position and said supporting position.

References Cited

UNITED STATES PATENTS

| | | | |
|---|---|---|---|
| 371,805 | 10/1887 | Vanderman | 269—127 |
| 1,317,973 | 10/1919 | Hallin | 269—269 X |
| 2,234,819 | 3/1941 | Butcher. | |
| 2,375,306 | 5/1945 | Koplin | 51—168 X |
| 2,500,204 | 3/1950 | Ronay. | |
| 2,804,272 | 9/1957 | Schmidt | 29—427 X |
| 3,020,629 | 2/1962 | Sage. | |
| 3,239,076 | 3/1966 | Huff. | |
| 3,289,282 | 12/1966 | Shaffer. | |

WAYNE A. MORSE, Jr., Primary Examiner

U.S. Cl. X.R.

29—427; 51—168; 269—127, 269